(12) United States Patent
Yoshida et al.

(10) Patent No.: US 6,342,301 B1
(45) Date of Patent: Jan. 29, 2002

(54) DIAMOND SINTERED COMPACT AND A PROCESS FOR THE PRODUCTION OF THE SAME

(75) Inventors: Katsuhito Yoshida; Michinari Asano; Junichi Shiraishi; Tetsuo Nakai, all of Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/362,093

(22) Filed: Jul. 28, 1999

(30) Foreign Application Priority Data

Jul. 31, 1998 (JP) .......................................... 10-216660

(51) Int. Cl.⁷ ................................................ B32B 9/00
(52) U.S. Cl. .................... 428/408; 427/372.2; 427/375; 427/376.1; 427/376.6; 427/377; 428/156; 428/174; 428/216; 428/336; 428/325; 428/698
(58) Field of Search ............................. 407/49; 51/295, 51/307, 309; 428/325, 323, 457, 469, 408, 698, 156, 174, 216, 336; 427/372.2, 375, 376.1, 376.6, 377

(56) References Cited

U.S. PATENT DOCUMENTS

| | | | | |
|---|---|---|---|---|
| 4,293,618 A | | 10/1981 | Hara et al. ................... | 428/551 |
| 4,784,023 A | * | 11/1988 | Dennis ......................... | 407/119 |
| 5,011,515 A | * | 4/1991 | Frushour ....................... | 51/307 |
| 5,120,327 A | * | 6/1992 | Dennis ......................... | 407/119 |
| 5,351,772 A | * | 10/1994 | Smith .......................... | 175/432 |
| 5,355,969 A | * | 10/1994 | Hardy et al. .................. | 175/432 |
| 5,379,854 A | * | 1/1995 | Dennis ......................... | 175/432 |
| 5,486,137 A | * | 1/1996 | Flood et al. .................. | 407/119 |
| 5,564,511 A | * | 10/1996 | Frushour ....................... | 175/431 |
| 5,598,750 A | * | 2/1997 | Griffin et al. ............... | 76/DIG. 6 |
| 5,662,720 A | * | 9/1997 | O'Tighearnaigh ............ | 51/309 |
| 5,906,246 A | * | 5/1999 | Mensa-Wilmot et al. ... | 175/432 |

FOREIGN PATENT DOCUMENTS

| | | |
|---|---|---|
| EP | 0460306 A1 | 12/1991 |
| EP | 0786300 A1 | 7/1997 |
| JP | 58-199777 | 11/1983 |

OTHER PUBLICATIONS

European Search Report dated Sep. 4, 2000.

* cited by examiner

Primary Examiner—Archene Turner
(74) Attorney, Agent, or Firm—McDermott, Will & Emery

(57) ABSTRACT

The present invention aims at providing a material for a diamond sintered compact tool, which has a high strength and is available as a material for a cutting tool.

Accordingly, the present invention is concerned with a diamond sintered compact comprising a WC-Co type cemented carbide substrate having slight undulation and a diamond sintered compact bonded to one surface of the substrate by sintering during a step of sintering at an ultra-high pressure and high temperature, which has a plate thickness is 0.5 mm to 5 mm and an outer diameter is at least 20 mm and whose diamond sintered compact layer has at least 50% of a thickness area within a range of 0.05 mm to 0.4 mm and contains Co diffusing from the cemented carbide substrate.

6 Claims, 3 Drawing Sheets

DIAMOND SINTERED COMPACT AND A PROCESS FOR THE PRODUCTION OF THE SAME

BACKGROUND OF THE INVENTION

1. Field of the Invention

This invention relates to a material for a diamond sintered compact tool (which will sometimes be referred to as "diamond sintered compact" simply), which has a high strength and is available as a material for a cutting tool, and a process for the production of the same.

2. Description of the Prior Art

At the present time, diamond sintered compacts have been produced for applying to industrial uses such as cutting tools, dies, bits, etc., used for cutting nonferrous metals, plastics, ceramics, etc., and used as a dresser, drill bit, wire drawing die, etc. In particular, a diamond sintered compact sintered at an ultra-high pressure and high temperature using a binder material containing an iron group metal such as cobalt, etc. as a predominant component has widely been used for cutting nonferrous metals, plastics, ceramics, etc., for dressers, drill bits and wire drawing dies.

Among these tools, in particular, a diamond sinterd compact tool used for a cutting tool is generally composed of a tool material comprising a diamond sintered compact layer having a thickness of about 0.5 to 1.5 mm and a WC-Co type cemented carbide substrate bonded therewith during a step where diamond grains are sintered with each other, the tool material being cut in a predetermined shape to give a cutting edge of a tool and then brazed to a base of a cemented carbide.

In processes for the production of diamond sintered compacts according to the prior art, for example, there is employed a method comprising arranging a metallic sheet of an iron group metal such as cobalt to be in contact with diamond powder as shown in FIG. 2, or mixing a metallic powder of an iron group metal such as cobalt with diamond powder, then allowing the iron group metal to be melted and impregnated in the diamond powder and simultaneously sintering the diamond powder at an ultra-high pressure and high temperature (Cf. JP-A-58-199777). However, the diamond sintered compact obtained by this method is not satisfied with respect to strength, because thermal stress remains in the sintered compact due to difference in thermal expansion between the diamond sintered compact layer and cemented carbide substrate and the strength is lowered by the residual stress during sintering.

The above described diamond sintered compact has excellent properties as a cutting tool for nonferrous metals and has widely been used, but on the other hand, has a problem that the strength is low due to the residual stress during sintering in spite of its excellent wear resistance. That is, in the material for a diamond sintered compact tool of the prior art, thermal stress remains in the sintered compact due to difference in thermal expansion between the diamond sintered compact layer and cemented carbide substrate and this residual stress has a bad influence upon the strength of the diamond sintered compact, so it can readily be assumed that the residual stress should be reduced in order to improve the strength. Since the thermal stress is due to difference in thermal expansion between the diamond sintered compact layer and cemented carbide substrate during sintering and complete removal of the thermal stress is difficult, however, no effective countermeasure to reduce the internal stress has been proposed. For example, a method of controlling the grain size of diamond grains or changing the kind of a binder to be employed has been proposed as a means for improving the strength of the diamond sintered compact, but the effects of such a method are limited.

SUMMARY OF THE INVENTION

It is an object of the present invention to provide a material for a high strength diamond sintered compact tool, whereby the above described problems of the prior art can be solved.

It is another object of the present invention to provide a process for the production of a high strength diamond sintered compact by sintering diamond grains with a binder, i.e. Co diffusing from a cemented carbide substrate.

These objects can be attained by a diamond sintered compact comprising a WC-Co type cemented carbide substrate having slight undulation and a diamond sintered compact bonded to one surface of the substrate by sintering during a step of sintering at an ultra-high pressure and high temperature, which has a plate thickness of 0.5 mm to 5 mm and an outer diameter of at least 20 mm and whose diamond sintered compact layer has at least 50% of a thickness area within a range of 0.05 mm to 0.4 mm and contains Co diffusing from the cemented carbide substrate. The WC-Co type cemented carbide used herein generally contains 4 to 20 weight % Co.

BRIEF DESCRIPTION OF THE DRAWINGS

The accompanying drawings are to illustrate the principle and merits of the present invention in more detail.

DETAILED DESCRIPTION OF THE INVENTION

Figure 1:
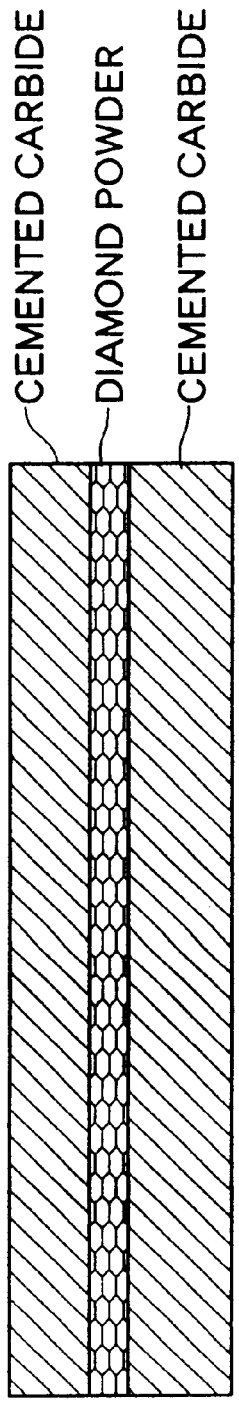
FIG. 1 is a cross-sectional view of a sample structure for preparing a diamond sintered compact according to a process of the present invention.
Figure 2:
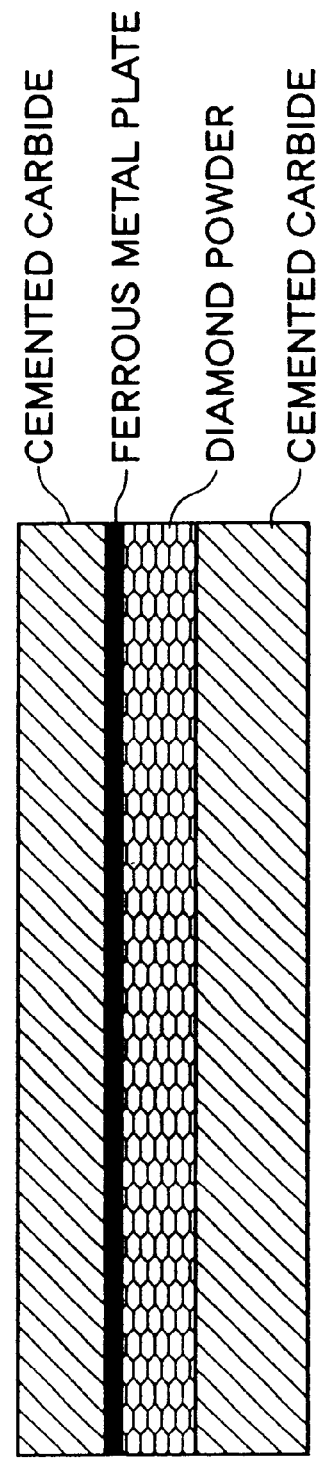
FIG. 2 is a cross-sectional view of a sample structure for preparing a diamond sintered compact according to a process of the prior art.

The inventors have made various efforts to obtain a high strength diamond sintered compact for the purpose of achieving the above described object and consequently, have reached the present invention.

The specified constructions of the present invention will now be summarized below:

(1) A diamond sintered compact comprising a WC-Co type cemented carbide substrate having slight undulation and a diamond sintered compact bonded to one surface of the substrate by sintering during a step of sintering at an ultra-high pressure and high temperature, which has a plate thickness of 0.5 mm to 5 mm, preferably 0.5 mm to 2 mm, and an outer diameter of at least 20 mm and whose diamond sintered compact layer has at least 50%, preferably 50% to 100% of a thickness area within a range of 0.05 mm to 0.4 mm, preferably 0.1 mm to 0.3 mm and contains Co diffusing from the cemented carbide substrate.

(2) The diamond sintered compact as described in the above (1), wherein a difference in undulation height of an interface between the cemented carbide substrate and diamond sintered compact layer is at most 0.2 mm, preferably 0.01 to 0.1 mm.

(3) The diamond sintered compact as described in the above (1) or (2), wherein the diamond grains forming the said diamond sintered compact have a grain size of 0.1 μm to 60 μm, preferably 0.1 μm to 10 μm, and 85 volume % to 99 volume %, preferably 85 volume % to 92 volume % of the diamond sintered compact consists of diamond grains bonded with each other.

(4) The diamond sintered compact as described in the above (1) or (2), wherein a shear strength at the interface between the said cemented carbide substrate and diamond sintered compact is at least 40 kg/mm$^2$, preferably 40 kg/mm$^2$ to 500 kg/mm$^2$.

(5) A process for the production of a diamond sintered compact comprising arranging only diamond powder having a grain size of 0.1 μm to 60 μm, preferably 0.1 μm to 10 μm, on a WC-Co type cemented carbide substrate and sintering the diamond grains using, as a binder, Co diffusing from the cemented carbide substrate in an ultra-high pressure producing apparatus at an ultra-high pressure and high temperature, at which diamond is stable.

(6) The process for the production of a diamond sintered compact, as described in the above (5), wherein the sintering condition is a pressure of 5.0 GPa to 6.5 GPa and a temperature of 1400° C. to 1600° C.

PREFERRED EMBODIMENTS OF THE INVENTION

That is, the inventors have found, as a result of various studies, that it is effective in order to reduce the internal residual stress in a diamond sintered compact to sinter diamond grains by using, as a binder, Co diffusing from the cemented carbide substrate, not by arranging a ferrous metal such as Co as in a process for the production of a diamond sintered compact of the prior art. In a preferred embodiment of the present invention, as shown in FIG. 1, a structural composition comprising diamond powder directly sandwiched in between cemented carbide plates is sintered at an ultra-high pressure.

As shown in the above described production processes (5) and (6), only diamond powder having a grain size of 0.1 μm to 60 μm, preferably 0.1 μm to 10 μm, is arranged on a WC-Co type cemented carbide substrate and sintered by exposing the diamond grains to an ultra-high pressure and high temperature, at which diamond is stable, in an ultra-high pressure producing apparatus, for example, a pressure of 5.0 GPa to 6.5 GPa and a temperature of 1400° C. to 1600° C., and using, as a binder, Co diffusing from the cemented carbide substrate. In this case, if the grain size is smaller than 0.1 mm, there arises such a problem that the diamond grain is dissolved in Co and lost, while if larger than 60 μm, the strength is markedly decreased.

The diamond sintered compact (1) obtained in this way comprises a WC-Co type cemented carbide substrate having slight undulation and a diamond sintered compact bonded to one surface of the substrate by sintering during a step of sintering at an ultra-high pressure and at a temperature, in which a difference in undulation height of an interface between the cemented carbide substrate and diamond sintered compact layer is suppressed to at most 0.2 mm, because of the reduced internal stress. Accordingly, even if the thickness of the diamond sintered compact layer is 0.05 mm to 0.4 mm, the most part of the sintered compact surface can be used for the tool edges.

If the thickness of the sintered compact layer is less than 0.05 mm, it is too thin to obtain a sufficient tool life, while if more than 0.4 mm, the amount of Co is lacking to result in insufficient sintering.

Since the real diamond sintered compact tool of the present invention exhibits a very high wear resistance depending on uses, the flank wear width is generally at most 0.1 mm and a thickness of a diamond sintered compact layer in a range of at least 0.5 mm is not required, but a thickness of a diamond sintered compact layer in a range of 0.05 mm to 0.4 mm is sufficient.

If the plate thickness is less than 0.5 mm, there arises a drawback that handling during fabrication of a tool is difficult and such a thickness is not suitable for a tool material because of being too thin, while if more than 5 mm, it is not used in ordinary tools because of being too thick. The outer diameter is adjusted to at least 20 mm, since if smaller than 20 mm, no merit is given with respect to the cost.

When the diamond sintered compact layer has at most 50% of a thickness area within a range of 0.05 mm to 0.4 mm, there arises a problem that the effect due to lowering of the internal stress is lost and the object of the present invention cannot be achieved.

Figure 4:
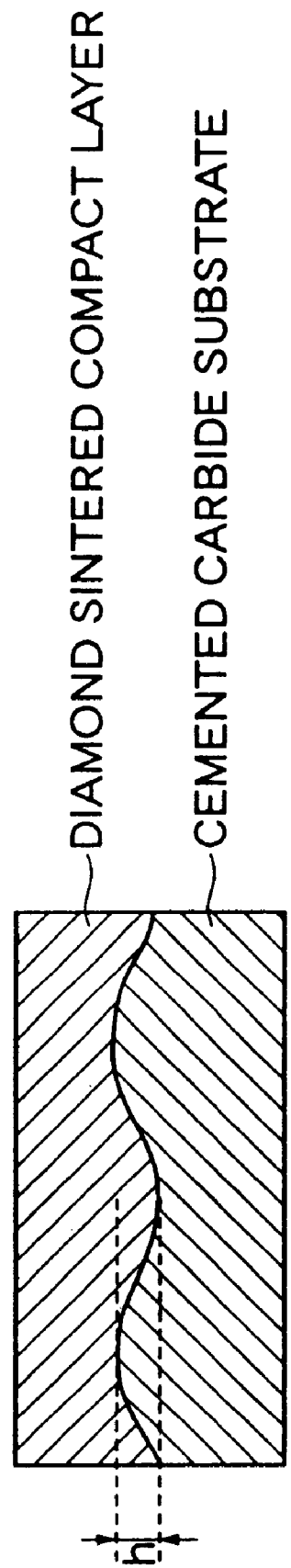
FIG. 4 is a schematic view of showing a difference h of an undulation height in a diamond sintered compact of the present invention.

In the diamond sintered compact of the present invention, furthermore, the cemented carbide substrate has slight undulation in an interface between the cemented carbide substrate and diamond sintered compact layer and a difference of this undulation height in the interface between them is preferably at most 0.2 mm, because the degree of the difference in undulation height represents that of the residual stress and accordingly, if the difference in undulation height exceeds 0.2 mm, the residual stress is increased to decrease the strength. Herein, by the difference in undulation height (undulation width) is meant "h" in the cross sectional view shown in FIG. 4.

On the other hand, the diamond sintered compact of the present invention is preferably formed of diamond grains having a grain size of 0.1 μm to 60 μm and 85 volume % to 99 volume % of the diamond sintered compact is preferably composed of the diamond grains. In this case, it is not required to use a binder for the diamond grains before sintering and Co diffusing from the diamond sintered compact during sintering is used as the binder phase, so that the shear strength at the interface between the diamond sintered compact and cemented carbide substrate is very high.

The reason why the internal residual stress is reduced in the material for the diamond sintered compact according to the present invention can be considered as follows: Since a process for the production of the diamond sintered compact according to the present invention is different from the prior art processes and comprises sintering by the use of Co diffusing from the WC-Co type cemented carbide substrate as a binder without previously arranging a ferrous metal such as Co plate, an intermediate composition of the diamond sintered compact and cemented carbide is formed, during the same time, near the interface between the diamond sintered compact layer and cemented carbide substrate, where thermal stress is moderated during diamond sintering.

In addition, the thickness of the diamond sintered compact layer is thin as represented by a thickness of 0.05 mm to 0.4 mm and this area extends to 85 volume % to 99 volume %. Accordingly, the stress added by the diamond sintered compact to the cemented carbide substrate is so small that the internal residual stress is small.

According to the above described reason, the stress is decreased, thus resulting in increase of the strength of the diamond sintered compact and further increase of the shear strength at the interface between the diamond sintered compact and cemented carbide substrate, for example, to at least 40 kg/mm$^2$, because of using Co diffusing out of the WC-Co type cemented carbide substrate.

Moreover, the thickness of the diamond sintered compact layer is so thin, for example, as represented by 0.05 mm to 0.4 mm that during cutting edge finish-machining, an amount of scraped diamond is decreased to reduce the machining cost.

The present invention will now be illustrated in detail by the following Examples without limiting the same.

EXAMPLE 1

A disk made of a cemented carbide (WC-4 to 6% Co) with a diameter of 29.5 mm and a thickness of 3 mm was arranged in a capsule made of Ta with an inner diameter of 30 mm. On the cemented carbide disk were charged diamond grains, which was then covered further with a disk made of a cemented carbide with a diameter of 29.5 mm and a thickness of 3 mm and lightly compressed at a pressure of about 100 MPa. The charged diamond grains have grain diameters as shown in Table 1. The charged amount of the diamond grains was controlled so that the thickness of the diamond grain layer be 0.7 mm to 0.8 mm during the same time.

When this capsule was processed at an ultra-high pressure and high temperature, for example, a pressure of 5.5 GPa and a temperature of 1450° C., a diamond sintered compact with a thickness of 0.3 mm to 0.4 mm, sandwiched in between the cemented carbide disks, was formed. In order to obtain a structure suitable for a tool material, the cemented carbide on one side of the sintered compact was completely removed by means of a surface-grinding machine and electric discharge working device. Consequently, there was obtained a material for a diamond sintered compact tool having a total thickness of about 3 mm and comprising a structure of a diamond sintered compact layer with a thickness of 0.2 to 0.25 mm bonded to a cemented carbide substrate having a maximum difference of 0.1 mm in undulation height. An area of the diamond sintered compact layer within this thickness range occupied about 80% of the whole area.

Then, from the thus obtained diamond sintered compact material was scraped off the base part of the cemented carbide to obtain a sample for measurement of the strength, consisting of simple substance of the diamond sintered compact. The sample for measurement of the strength was finally finish-machined in a length of 6 mm, width of 3 mm and thickness of 0.2 mm.

For comparison, Comparative Samples with the same size were prepared using diamond sintered compacts (Sample Nos. A to D) according to the prior art. Using these samples, the strength (transverse rupture strength) of the sintered compact materials was measured by a three point bending test at a condition of 4 mm in span distance.

Results of the strength tests carried out in this way are summarized in Table 1, in which Grain Diameter ($\mu$m) show a minimum to maximum distribution.

TABLE 1

| Sample No. | Diamond Grain Diameter ($\mu$m) | Strength of Sintered Compact (kgf/mm$^2$) |
| --- | --- | --- |
| 1 | 0.1~4 | 200 |
| 2 | 0.1~10 | 155 |
| 3 | 0.1~50 | 130 |
| 4 | 0.1~60 | 110 |
| Prior Art | | |
| A | 0.1~4 | 185 |
| B | 0.1~10 | 145 |
| C | 0.1~50 | 125 |
| D | 0.1~60 | 100 |

As is evident from Table 1, the diamond sintered compacts of the present invention have higher strengths than the diamond sintered compacts of the prior art, having the same grain size.

EXAMPLE 2

Sample No. 1 and Sample No. A of the diamond sintered compacts obtained in Example 1 were cut in objects with a predetermined shape and respectively brazed to tool substrates to prepare cutting tools [diamond sintered compact brazed to one corner of cemented carbide, in the form of a regular triangle with an inscribed circle of 9.525 mm, insert relief angle 11° (overall periphery) and thickness 3.18 mm, and a cutting edge in R-shape of radius of 0.4 mm].

Using the resulting cutting tool, estimation of the cutting properties was carried out under the following conditions:

Workpiece: Round Rod of Al-16 weight % Si alloy

Rotation Rate of Workpiece Surface: 600 m/min (experimental data)

Cutting Depth: 0.5 mm (experimental data)

Feed Rate: 0.12 mm/rev (experimental data)

Wet Process

Figure 3:
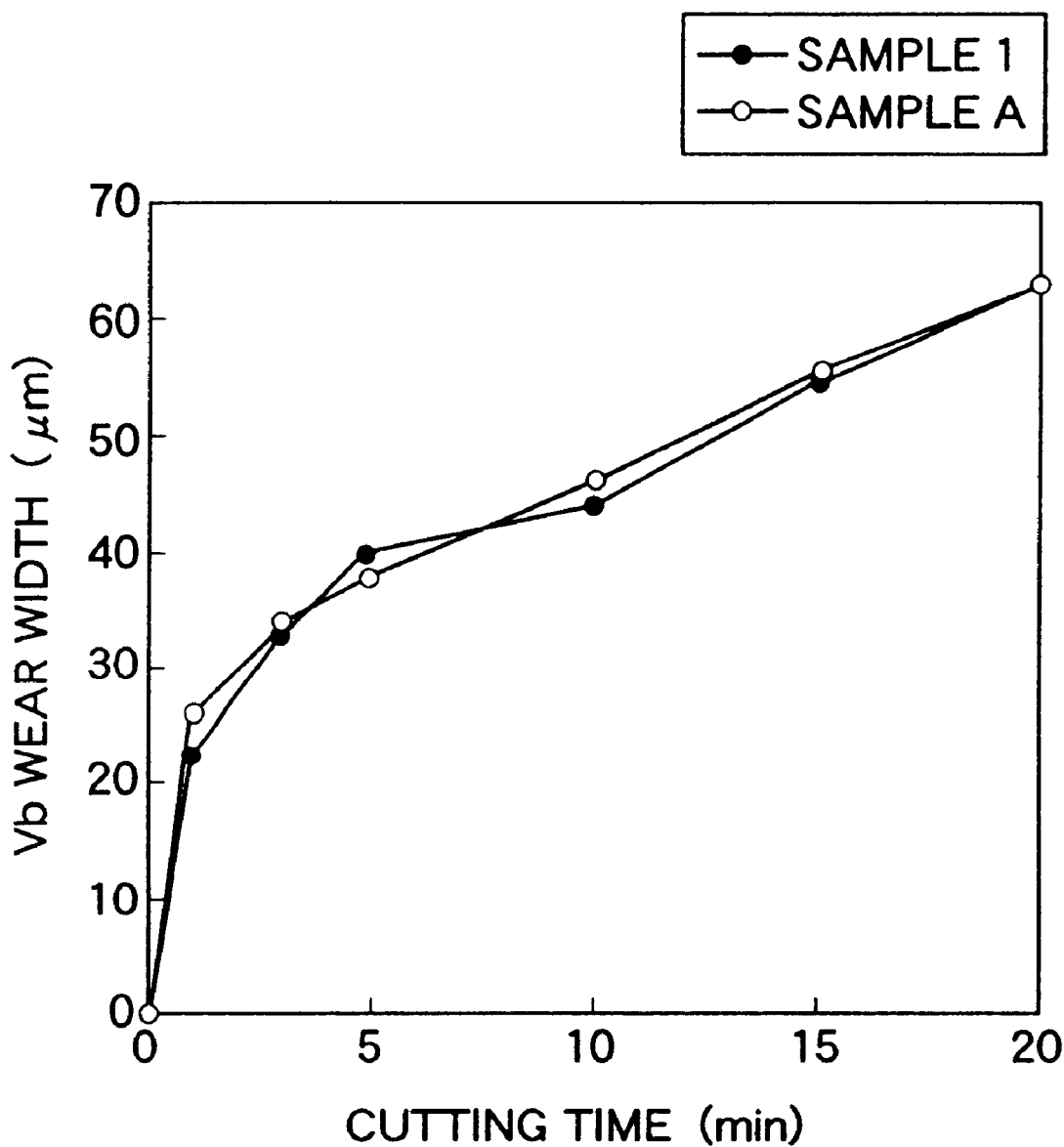
FIG. 3 is a graph showing results of a cutting property estimation test of a diamond sintered compact according to a process of the present invention and another diamond sintered compact according to a process of the prior art by a relationship of a cutting time and Vb wear width.

Results of the cutting property estimation test are shown in FIG. 3. It will clearly be understood from FIG. 3 that the tool using the diamond sintered compact material according to the present invention (Sample No. 1) exhibits an equal cutting property to the tool prepared from the diamond sintered compact of the prior art (Sample No. A).

ADVANTAGES OF PRESENT INVENTION

The diamond sintered compact according to the present invention has an excellent strength as a cutting tool material and is much more improved than the diamond sintered compacts of the prior art. Furthermore, the diamond sintered compact of the present invention can more economically be produced with respect to the cost as compared with the diamond sintered compacts of the prior art.

What is claimed is:

1. A diamond sintered compact comprising a WC-Co cemented carbide substrate having an undulation and a diamond sintered compact layer bonded to one surface of the substrate by sintering during a step of sintering at an ultra-high pressure and high temperature, wherein the diamond sintered compact has a plate thickness of 0.5 mm to 5 mm and an outer diameter of at least 20 mm, and the diamond sintered compact layer has at least 50% of a thickness area within a range of 0.05 mm to 0.4 mm and contains Co diffusing out of the cemented carbide substrate.

2. The diamond sintered compact as claimed in claim 1, wherein a difference in undulation height of an interface between the cemented carbide substrate and the diamond sintered compact layer is at most 0.2 mm.

3. The diamond sintered compact as claimed in claim 1, wherein the diamond grains forming the said diamond sintered compact layer have a grain size of 0.1 $\mu$m to 60 $\mu$m and 85 volume % to 99 volume % of the diamond sintered compact layer consists of diamond grains bonded with each other.

4. The diamond sintered compact as claimed in claim 1, wherein a shear strength at the interface between the said cemented carbide substrate and the diamond sintered compact layer is at least 40 kg/mm$^2$.

5. A process for the production of a diamond sintered compact as claimed in claim 1 comprising arranging only diamond powder having a grain size of 0.1 $\mu$m to 60 $\mu$m on a WC-Co cemented carbide substrate and sintering the diamond grains using, as a binder, Co diffusing from the cemented carbide substrate in an ultra-high pressure producing apparatus at an ultra-high pressure and high temperature, at which diamond is stable.

6. The process for the production of a diamond sintered compact, as claimed in claim 5, wherein the said sintering condition is a pressure of 5.0 GPa to 6.5 GPa and a temperature of 1400° C. to 1600° C.

\* \* \* \* \*